(12) United States Patent
Toor et al.

(10) Patent No.: US 6,661,558 B2
(45) Date of Patent: Dec. 9, 2003

(54) RENEWABLE LIQUID REFLECTING ZONE PLATE

(75) Inventors: Arthur Toor, Waldport, OR (US); Dmitri D. Ryutov, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 6 days.

(21) Appl. No.: 10/028,418

(22) Filed: Dec. 19, 2001

(65) Prior Publication Data

US 2002/0101662 A1 Aug. 1, 2002

Related U.S. Application Data

(60) Provisional application No. 60/258,192, filed on Dec. 22, 2000.

(51) Int. Cl.[7] .............................. G02F 1/03; G02F 1/07
(52) U.S. Cl. ..................... 359/254; 359/253; 359/565
(58) Field of Search ............................ 359/253, 254, 359/565, 572, 573, 846, 847, 291, 295, 297, 665, 666; 324/702, 703, 713, 719; 378/119; 385/14

(56) References Cited

U.S. PATENT DOCUMENTS

| 3,653,742 A | | 4/1972 | Buchan | 359/254 |
|---|---|---|---|---|
| 4,128,310 A | * | 12/1978 | Miller | 359/847 |
| 4,488,785 A | * | 12/1984 | Kohashi | 359/295 |
| 4,909,626 A | | 3/1990 | Purvis et al. | 356/332 |
| 4,958,919 A | | 9/1990 | Sigler | 359/665 |
| 5,033,831 A | | 7/1991 | Sigler | 359/665 |
| 5,074,629 A | * | 12/1991 | Zdeblick | 385/14 |
| 5,532,880 A | | 7/1996 | Robb | 359/665 |
| 5,650,880 A | | 7/1997 | Shuter et al. | 359/846 |
| 5,687,022 A | | 11/1997 | Robb | 359/356 |
| 6,369,954 B1 | * | 4/2002 | Berge et al. | 359/666 |
| 2002/0118458 A1 | * | 8/2002 | Ryutov et al. | 359/572 |
| 2002/0135908 A1 | * | 9/2002 | Ryutov et al. | 359/846 |
| 2003/0002156 A1 | * | 1/2003 | Hobbs et al. | 359/573 |

OTHER PUBLICATIONS

Ragazzoni, et al., "A liquid adaptive mirror," Astronomy and Astrophysics, 283, L–17–L–19 (3 pages) (1994).
Ragazzoni, et al., "Electromagnetic driven liquid mirrors," SPIE vol. 2263, pp. 379–385 (7 pages) (1994).
Hong, et al., "Magneto–chromatic effects of tunable magnetic fluid grating," Journal of Applied Physics, vol. 83, No. 11, pp. 6771–6773 (3 pages) (Jun. 1, 1998).
Horng, et al., "Magnetochromatics resulted from optical gratings of magnetic fluid films subjected to perpendicular magnetic fields," Journal of Applied Physics, vol. 88, No. 10, pp. 5904–5908 (5 pages) (Nov. 15, 2000).
Ryutov, et al., "Optical elements based on the use of renewable liquid films with magneto–electrostatic control," Review of Scientific Instruments, vol. 72, No. 11, pp. 4042–4054 (13 pages), Nov. 2001.
Toor, et al., "Renewable liquid zone plate for 8 keV X rays," UCRL–JC–141769–ABS, Lawrence Livermore National Laboratory, (2 pages) (2000).

* cited by examiner

Primary Examiner—Jordan M. Schwartz
Assistant Examiner—Jessica T Stultz
(74) Attorney, Agent, or Firm—Eddie E. Scott; Alan H. Thompson

(57) ABSTRACT

A renewable liquid reflecting zone plate. Electrodes are operatively connected to a dielectric liquid in a circular or other arrangement to produce a reflecting zone plate. A system for renewing the liquid uses a penetrable substrate.

18 Claims, 3 Drawing Sheets

RENEWABLE LIQUID REFLECTING ZONE PLATE

CROSS-REFERENCE TO RELATED APPLICATIONS

This application claims the benefit of U.S. Provisional Application No. 60/258,192, filed Dec. 22, 2000, and entitled "Renewable Thin-Liquid-Film Reflecting Apparatus," which is incorporated herein by this reference. U.S. patent application Ser. No. 10/028,411, filed Dec. 19, 2001 entitled "Universally Oriented Renewable Liquid Mirror" and U.S. patent application Ser. No. 10/027,722, filed Dec. 19, 2001 entitled "Renewable Liquid Reflection Grating" describing related inventions are being filed simultaneously with this application. The specification, drawings, and disclosure of U.S. patent application Ser. No. 10/028,411, filed Dec. 19, 2001 entitled "Universally Oriented Renewable Liquid Mirror" and U.S. patent application Ser. No. 10/027,722, filed Dec. 19, 2001 entitled "Renewable Liquid Reflection Grating" are incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to a liquid reflecting zone plate.

2. State of Technology

Zone plates are used for focusing light waves in various spectral ranges. They are made of transmissive or reflecting solid materials. In applications where one deals with high-power pulses of radiation these zone plates will be damaged and would require replacement after every pulse, introducing significant operational expenses.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a renewable liquid reflecting zone plate suitable for the use with high-power short pulses, and not requiring replacement of any permanent components. The reflecting zone plate is created by applying voltage to electrodes situated underneath a surface of a thin dielectric liquid film, which can be renewed after every pulse.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
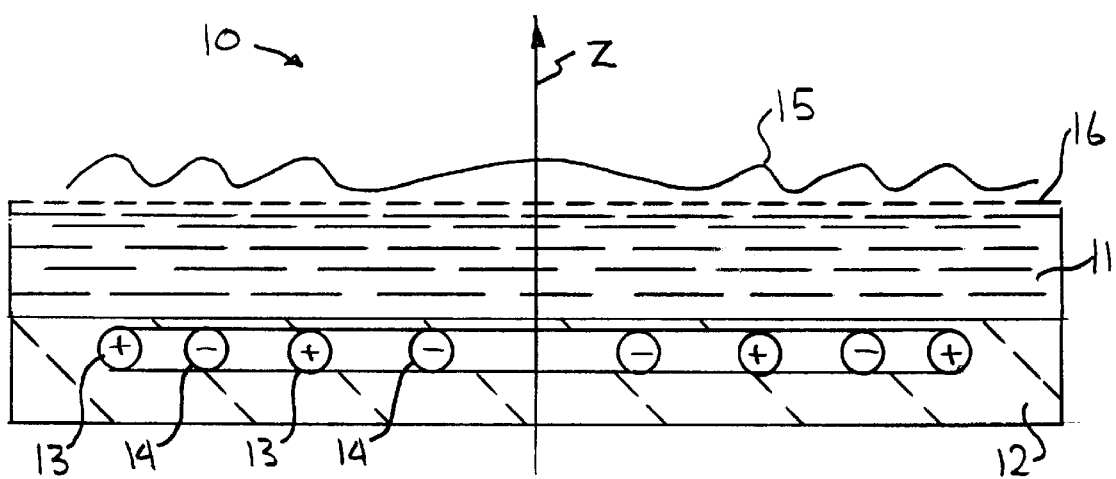
FIG. 1 illustrates an embodiment of a liquid reflecting zone plate of the present invention.

Referring now to the drawings, to the following detailed information, and to incorporated materials; a detailed description of the invention, including specific embodiments, is presented. The detailed description serves to explain the principles of the invention. The invention is susceptible modifications and alternative forms. The invention is not limited to the particular forms disclosed. The invention covers all modifications, equivalents, and alternatives falling within the spirit and scope of the invention as defined by the claims.

FIG. 1 shows an embodiment of the present invention wherein a reflecting zone plate is created by deforming the surface of a liquid 11 to create the required surface structure. In the schematic drawing of FIG. 1, the reflecting zone plate is designated generally by the reference numeral 10. The rotation axis is "Z." Charged rings 13 and 14 are shown in cross-sections. The dotted line 16 shows unperturbed fluid surface. The height of the surface perturbations 15 is exaggerated in FIG. 1 for illustration purposes. The liquid 11 shown in FIG. 1 is a dielectric liquid. Specific examples include various alcohols, from ethyl alcohol $C_2H_6O$ to benzyl alcohol $C_7H_8O$; glycerin; heavy hydrocarbons, like $C_9H_{20}$.

The distance between the consecutive rings 13 and 14 is in the range of a fraction of a millimeter to a few of millimeters, whereas the amplitude of the surface modulation lies between a fraction of the micrometer to a few tens of angstroms. The zone plate 10 is created by positioning or plating an array of thin wires on the surface of a dielectric substrate 12 covered by a thin (a few micrometers to a hundred micrometers) film 11 of a liquid dielectric. By applying a voltage between the neighboring wires 13 and 14, a nonuniform electrostatic field is created; the arising ponderomotive force distorts the surface of the liquid film, creating the desired surface relief, a set of concentric bumps and dips. The width of each bump (dip) should be equal to the width of the corresponding Fresnel zone. This will not be a stepwise zonal plate, because transitions between top and bottoms of the surface structure will be smooth, but it will work in a similar way, yielding a significant amplification of the light intensity in the focal point. For grazing incidence applications, a linear zone plate providing a cylindrical focus, can be made.

Figure 2:
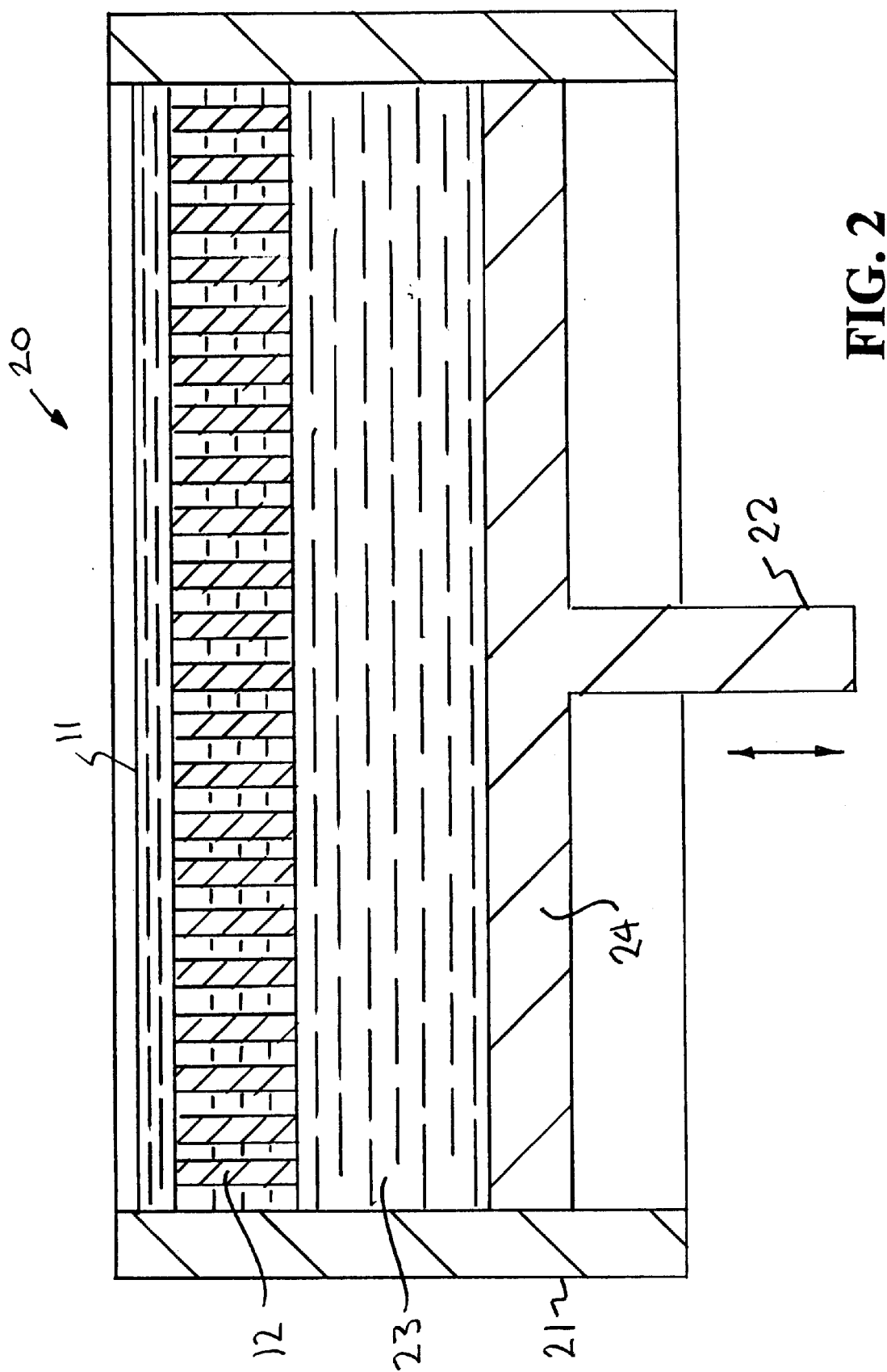
FIG. 2 illustrates a system for renewing the liquid surface after every pulse.

Referring now to FIG. 2, another embodiment of a system incorporating the present invention is illustrated. This system is generally designated by the reference numeral 20. The system 20 provides a renewable liquid zone plate. A substrate 12 is made of a porous material so that the liquid film 11 is pressed through it before the laser pulse and then sucked out in every cycle. A working fluid 23 is pressed through the dielectric porous substrates 12. The substrate is made of fused capillaries of the same radius $r_{cap}$. The film is renewed after each laser pulse by a motion of the piston 24 situated behind the substrate. The liquid 23 will be pulled through the pores into the plenum and, before next laser pulse, will be pushed through the pores to form a flat initial surface. In another embodiment a continuous flow of liquid through the plenum behind the substrate is created and is connected to a fluid purification system. Other porous substrates can be used. It is also possible to push and pull the liquid not by a piston, but by a flexible membrane driven by actuators situated behind it. Referring now to FIG. 1 for illustration purposes, the liquid film 11 is shown operatively connected to the substrate 12 containing the charged rings 13 and 14.

Damage to optical elements is a well-known constraint in developing pulsed or rep-rate high-intensity laser systems. Destruction of the zone plate during one pulse (at highest intensities), or gradual damage due to the thermal fatigue in the rep-rate mode, limit the power level. In particular, the Linac Coherent Light Source (LCLS) to be built in SLAC will generate X-ray pulses with the energy ~10 mJ per pulse, with the X-ray beam diameter ~100 $\mu$m, pulse width ~200 fs, and the rep rate 120 Hz. Such pulses may cause surface damage even for incidence angles of a few milli-radians. Other systems where damage to the optical elements is a serious design constraint, include rep-rate lasers for commercial applications, as well as pulsed lasers for scientific research. Another application is the using of renewable liquid zone plates as elements of optical diagnostics in high-energy-density experiments, like the National Ignition Facility at Lawrence Livermore National Laboratory, Z facility at Sandia, and others, where these zone plates could be placed much closer to the point of the energy release than conventional solid-state plates. A renewable liquid reflecting zone plate that can be used at high fluences, with no damage to the permanent elements of the structure is illustrated by the embodiment shown FIG. 2.

Figure 3:
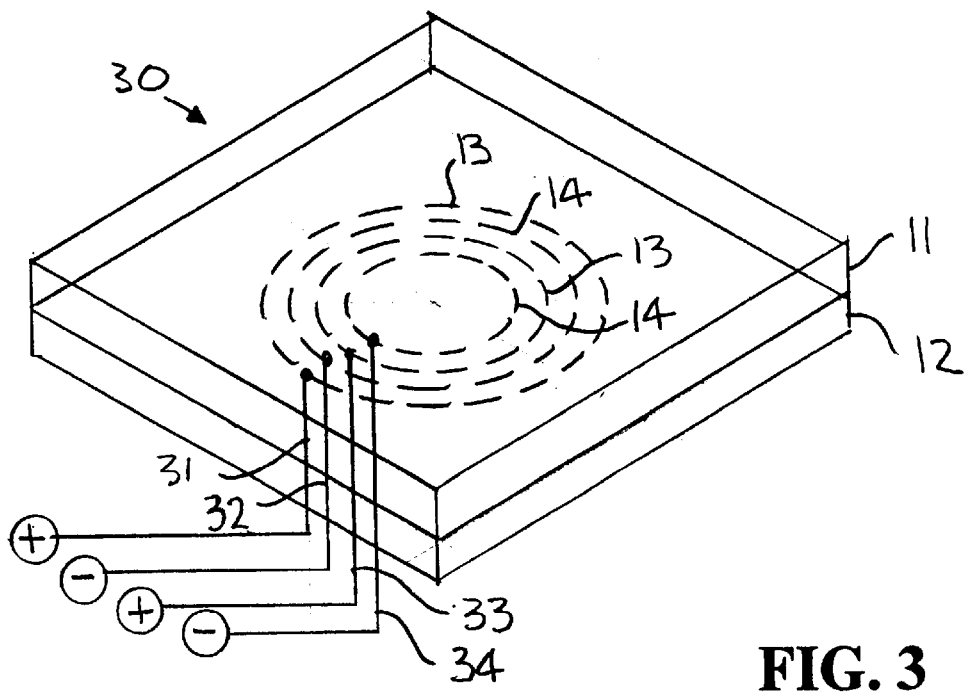
FIG. 3 shows a 3D view of the system shown in FIG. 1.

FIG. 3 shows a 3D view of a circular zone plate, with 11 and 12 being the liquid film and the porous substrate, respectively, 13 and 14 being the ring electrodes, and 31–34 being conductors that connect the ring electrodes with the power supply.

For a normal incidence, the required height of the surface features is $\Delta h \sim \lambda_x/4$, where $\lambda_x$ is the wavelength of the light. The width of the every zone is much larger: the scale is $L \sim (\lambda_x F)^{1/2}$ where F is the focal length. The required electric field strength on the surface of the film is determined by balancing the ponderomotive force, $E^2/8\pi$, against the capillary force, which scales as $\alpha \Delta h/L^2$, where $\alpha$ is the capillary constant. When writing the ponderomotive force, we assume that the dielectric constant of the film, $\epsilon$, is not very large, ~1. Equating the two forces, one obtains the following estimate for the required electric field strength: $E^2/8\pi \sim \alpha/4F$. Taking as a representative value of the capillary constant $\alpha \sim 100$ erg/cm$^2$, and the focal distance F~100 cm, one finds that the required electric field strength is ~1 kV/cm. For visible light ($\lambda_x \sim 0.5$ $\mu$m) and the focal length 100 cm, the size of the first few Fresnel zones is equal to ~0.7 mm. This sets the scale of the voltages required to create the aforementioned electric field: $\Delta U \sim 70$ V. The thickness of the film should be of order of L/$\pi$ (in the aforementioned example this is ~200 $\mu$m).

For X rays with the wavelength of 1.5 Å, characteristic of LCLS one has to use grazing incidence optics, with the incidence angle $\theta$ (counted from the surface of the plate) being ~10 mrad or less (otherwise, the reflectivity becomes prohibitively low). In this case, it is inefficient to use circular zone plate. Instead, one can use a linear zone plate, providing a cylindrical focus. The length of the plate will then be much greater than its width. For small $\theta$, the required amplitude of surface relief becomes $\Delta h \sim \lambda_x/4\theta$ and the width of the zones becomes $L \sim (\lambda_x F)^{1/2}/4\theta$. For the focal length of 100 cm and $\theta = 10^{-2}$, L is ~1 mm. In other words, the thickness of the film in this case has to be 300 micrometers. The electric field required to produce this surface relief becomes ~100 V/cm, with the voltage between neighboring wires in the range of 10 V.

Figure 4:
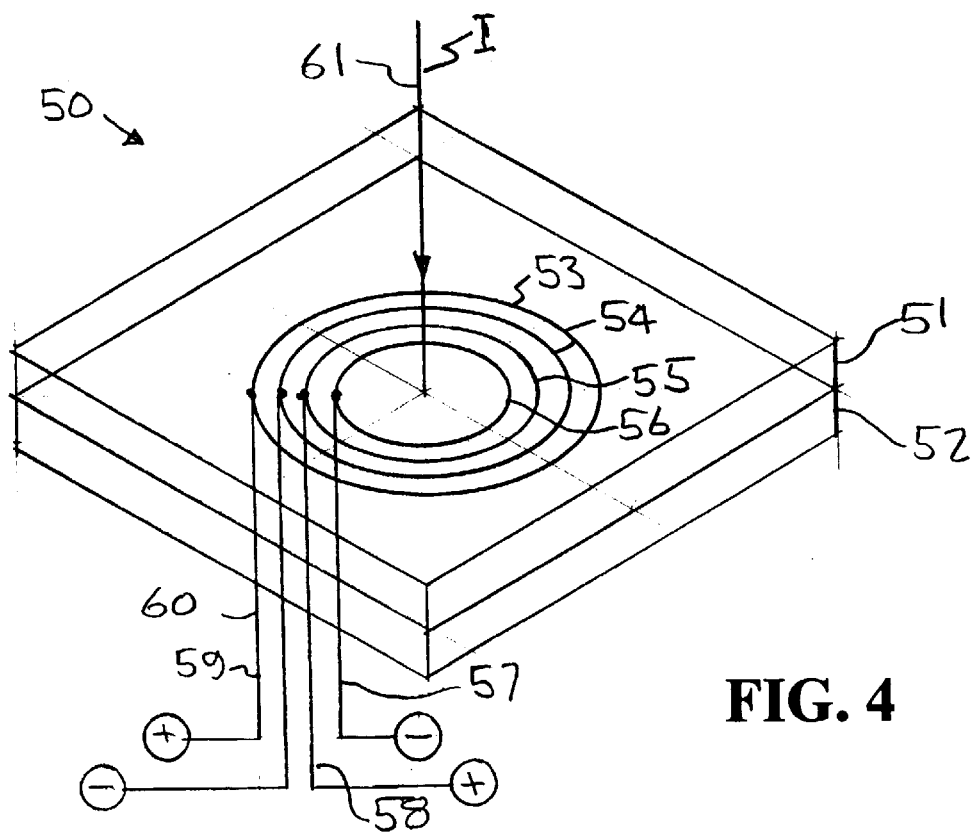
FIG. 4 illustrates an embodiment of a renewable liquid reflecting zone plate in the case of a conducting fluid.

A renewable liquid reflecting zone plate can also be created in the films of a conducting fluid (e.g., mercury, gallium, and NaK alloy). In this case an arrangement shown in FIG. 4 can be used. 51 is a film of a conducting fluid and 52 is a porous substrate, through which the working fluid is moved up (before the arrival of the optical pulse) and down (after the end of the optical pulse). 53–56 are conducting ring electrodes which are in electrical contact with the working fluid. 57–58 are conductors connecting the rings with a power supply, 61 is an external vertical current driven through a rod (not shown) through a small hole in the central part of the plate (not shown). The dips and bumps are created by a ponderomotive force generated via an interaction of the radial currents between the rings and the azimuthal magnetic field of the external current 61. The renewable system is the same as in the aforementioned embodiments.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A renewable liquid reflecting laser zone plate for reflecting short pulses, comprising:
   a dielectric or conducting liquid, said liquid having a surface for reflecting said short pulses, and
   electrodes positioned below said surface and operatively connected to said dielectric or conducting liquid in a circular or other arrangement that produces said reflecting laser zone plate, and
   a system for renewing the liquid.

2. The liquid reflecting laser zone plate of claim 1, wherein said electrodes are ring electrodes comprising alternately spaced positive and negative ring electrodes.

3. The liquid reflecting laser zone plate of claim 1, wherein said electrodes are linear electrodes comprising alternately spaced positive and negative linear electrodes.

4. The liquid reflecting laser zone plate of claim 1, wherein said electrodes are positioned in a substrate.

5. The liquid reflecting laser zone plate of claim 4, wherein said substrate is a penetrable unit operatively connected to said liquid.

6. The liquid reflecting laser zone plate of claim 5, wherein said penetrable unit is a porous unit.

7. The liquid reflecting laser zone plate of claim 5, wherein said penetrable unit is a capillary substrate.

8. The liquid reflecting laser zone plate of claim 5, including a system for moving said dielectric or conducting liquid through said penetrable unit to produce said reflecting laser zone plate.

9. The liquid reflecting laser zone plate of claim 8, wherein said system for moving said liquid through said penetrable unit is a piston.

10. The liquid reflecting laser zone plate of claim 8, wherein said system for moving said liquid through said penetrable unit is a flexible membrane driven by an actuator.

11. The liquid reflecting laser zone plate of claim 8, wherein said system for moving said liquid through said penetrable unit is a bellows.

12. A method of producing a liquid reflecting laser zone plate for reflecting short pulses comprising providing a renewable dielectric or conducting liquid having a surface for reflecting said short pulses, positioning electrodes below said surface and located relative to said dielectric or conducting liquid in a circular or other arrangement that produces said reflecting laser zone plate for reflecting short pulses.

13. The method of providing a liquid reflecting laser zone plate of claim 12, wherein said step of positioning electrodes comprises alternately spacing positive ring electrodes and negative ring electrodes relative to said liquid to produce said reflecting laser zone plate.

14. The method of providing a liquid reflecting laser zone plate of claim 12, wherein said step of positioning electrodes comprises alternately spacing positive linear electrodes and negative linear electrodes relative to said liquid to produce said reflecting laser zone plate.

15. The method of providing a liquid reflecting laser zone plate of claim 12, including positioning a penetrable unit in an operative position relative to said liquid to withdraw and refresh said dielectric liquid.

16. The method of providing a liquid reflecting laser zone plate of claim 15, wherein said penetrable unit is a porous substrate.

17. The method of providing a liquid reflecting laser zone plate of claim 16, including moving said dielectric or conducting liquid through said porous substrate to produce said reflecting laser zone plate.

18. The method of providing a liquid reflecting laser zone plate of claim 17, including using a piston, or bellows, or flexible membrane to move said liquid through said porous substrate to produce said reflecting laser zone plate.

* * * * *